(12) United States Patent
Colson et al.

(10) Patent No.: US 7,552,184 B2
(45) Date of Patent: *Jun. 23, 2009

(54) SYSTEM AND METHOD FOR ALLOWING A USER TO ENSURE ACTIONS TAKEN ON A DOCUMENT ARE APPLIED TO THE MOST RECENT ELECTRONIC CORRESPONDENCE

(75) Inventors: James Campbell Colson, Austin, TX (US); Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/126,468

(22) Filed: May 23, 2008

(65) Prior Publication Data
US 2008/0222265 A1   Sep. 11, 2008

Related U.S. Application Data

(63) Continuation of application No. 10/849,611, filed on May 20, 2004, now Pat. No. 7,395,315.

(51) Int. Cl.
*G06F 15/16* (2006.01)
(52) U.S. Cl. .................. 709/206; 709/207; 709/224
(58) Field of Classification Search ................. 709/206, 709/207, 224, 200; 455/412.1, 500, 11.1; 715/758
See application file for complete search history.

(56) References Cited

U.S. PATENT DOCUMENTS

| | | | |
|---|---|---|---|
| 6,370,567 B1 | 4/2002 | Ouchi | |
| 6,757,518 B2 * | 6/2004 | Spratt et al. | 455/11.1 |
| 7,028,263 B2 * | 4/2006 | Maguire | 715/758 |
| 2001/0021654 A1 * | 9/2001 | Spratt et al. | 455/500 |
| 2002/0099777 A1 | 7/2002 | Gupta et al. | |
| 2002/0184317 A1 | 12/2002 | Thankachan | |
| 2002/0194014 A1 | 12/2002 | Starnes et al. | |
| 2003/0023675 A1 | 1/2003 | Ouchi et al. | |

(Continued)

FOREIGN PATENT DOCUMENTS

JP   9284334   10/1997

(Continued)

*Primary Examiner*—Le Luu
(74) *Attorney, Agent, or Firm*—Yee & Associates, P.C.; Jill A. Poimboeuf

(57) ABSTRACT

A method, apparatus, and computer instructions for indicating most recent documents, such as email messages in a message file. A determination is made as to whether a more recent message in a thread of related messages is present in the message file in response to a first user input selecting a message for processing. A first indication of the more recent message is presented if the more recent message in the thread of related messages is present in the message file. A determination is made as to whether the more recent message in the thread of related messages has been received in the message file in response to a second user input to send the message. A second indication of the more recent message in the thread of related messages is presented if the more recent message in the thread of related messages has been received in the message file.

22 Claims, 6 Drawing Sheets

U.S. PATENT DOCUMENTS

| | | |
|---|---|---|
| 2003/0064707 A1* | 4/2003 | Yoneyama ................. 455/412 |
| 2003/0160818 A1 | 8/2003 | Tschiegg et al. |
| 2003/0167194 A1 | 9/2003 | Piccinelli |
| 2004/0260756 A1* | 12/2004 | Forstall et al. ............. 709/200 |
| 2005/0108402 A1 | 5/2005 | Colson et al. |
| 2005/0144573 A1* | 6/2005 | Moody et al. ............... 715/825 |

FOREIGN PATENT DOCUMENTS

JP 2001142801 5/2001

* cited by examiner

SYSTEM AND METHOD FOR ALLOWING A USER TO ENSURE ACTIONS TAKEN ON A DOCUMENT ARE APPLIED TO THE MOST RECENT ELECTRONIC CORRESPONDENCE

This application is a continuation of application Ser. No. 10/849,611, filed May 20, 2004, status allowed.

BACKGROUND OF THE INVENTION

1. Technical Field

The present invention relates generally to an improved data processing system, and in particular, to a method and apparatus for managing the transfer of data. Still more particularly, the present invention relates to a method, apparatus, and computer instructions for managing email messages exchanged between users.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the one commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML).

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

Another popular use of the Internet is for the exchange of electronic mail, also referred to as "email" messages. An email system typically involves a server-based mail program residing on a server computer to manage the exchange of email messages over one or more networks and a client-based mail program residing on the client to implement a mailbox that receives and holds the email messages for a user. Typically, these client-based programs also include a graphical user interface to enable a user to easily and conveniently open and read email messages in addition to creating new email messages.

Email is used both at home and work by many users. At home, email is a widespread form of communication that has quickly overtaken the "written" letter. In the work area, email is becoming increasingly important to the flow of information for business processes. Many workflow steps are required for the propagation of an email message, either as a "reply" or as a "forward" of the information. Each step in the workflow, after the creation of the initial email message, involves, for example, a user initiating a reply, adding or modifying content for the initial email message, and then sending the reply. A user may reply to an email message by either replying to the sender through using a "reply" option or reply to the sender and all of the recipients through the use of a "reply to all" option. The "reply to all" option is often used in the workflow process so that all of the participants in a discussion or exchange of information may see comments from the sender of a reply.

As a result, a user may receive multiple comments from different users for a single email message when that email message has been distributed to a number of different users. In some cases, a user may reply to a message without realizing that another user has made a reply that may change the content of the user's message. Each time a reply is made, a newer copy or version of the email message is generated. A new copy or version also is generated when a message is forwarded to a recipient. One key recurring problem in email systems, when used in a business process, is an inability for a user to ensure that the selected email message for propagation is the most recently available copy or version of the email message. Currently, a user is required to scan their "inbox" to verify that they have selected the correct version of the email message.

A user visually scanning an "inbox" to identify a most recent version of an email message may be difficult in some cases. For example, in some cases, a user may receive hundreds of email messages in a single day. Scanning the inbox is subject to user error in skipping or missing a message. Further, while composing a message, a reply may be received from another user that may affect the content of the message that the user is composing.

Therefore, it would be advantageous to have an improved method, apparatus, and computer instructions for ensuring that actions taken on a document are applied to the most recent email message.

SUMMARY OF THE INVENTION

The present invention provides a method, apparatus, and computer instructions for indicating most recent documents, such as email messages in a message file. A determination is made as to whether a more recent message in a thread of related messages is present in the message file in response to a first user input selecting a message for processing. A first indication of the more recent message is presented if the more recent message in the thread of related messages is present in the message file. A determination is made as to whether the more recent message in the thread of related messages has been received in the message file in response to a second user input to send the message. A second indication of the more recent message in the thread of related messages is presented if the more recent message in the thread of related messages has been received in the message file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
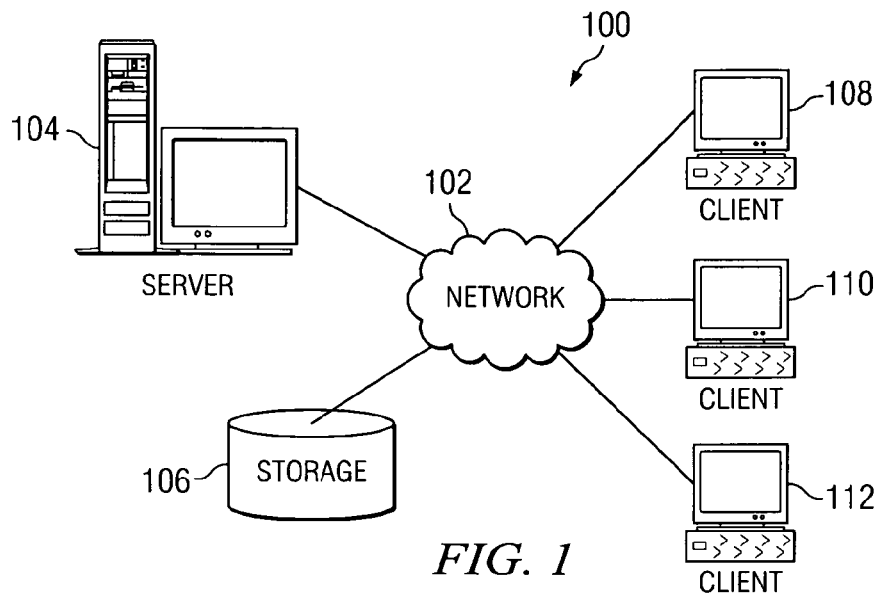
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides servers as an email server to provide email services to clients 108-112. Clients 108, 110, and 112 are clients to server 104 and use server 104 to send and receive email messages. Each of these clients may contain an email message program that sends and receives email messages. Alternatively, clients 108-112 may use a Web based email system in which a browser program is to send and receive email messages. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
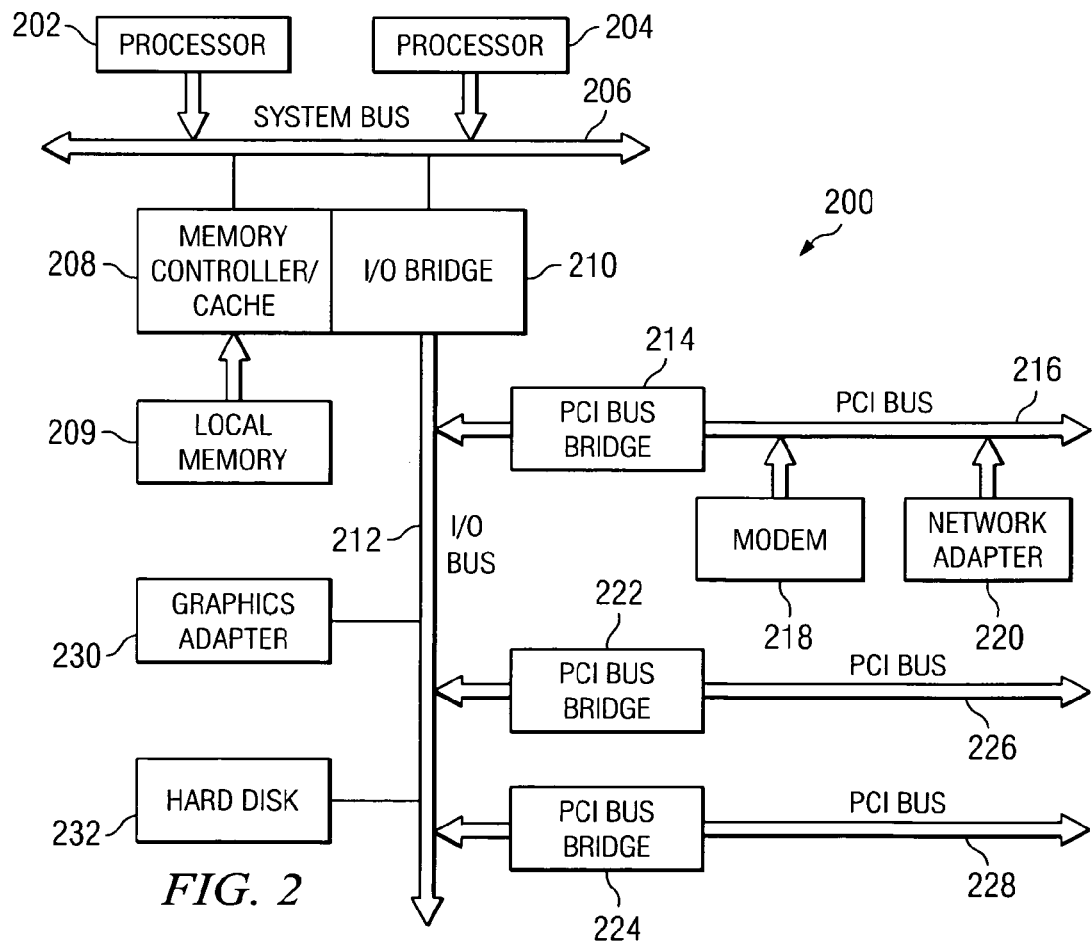
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 is employed to function as an email server in these examples.

Data processing system 200 is a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
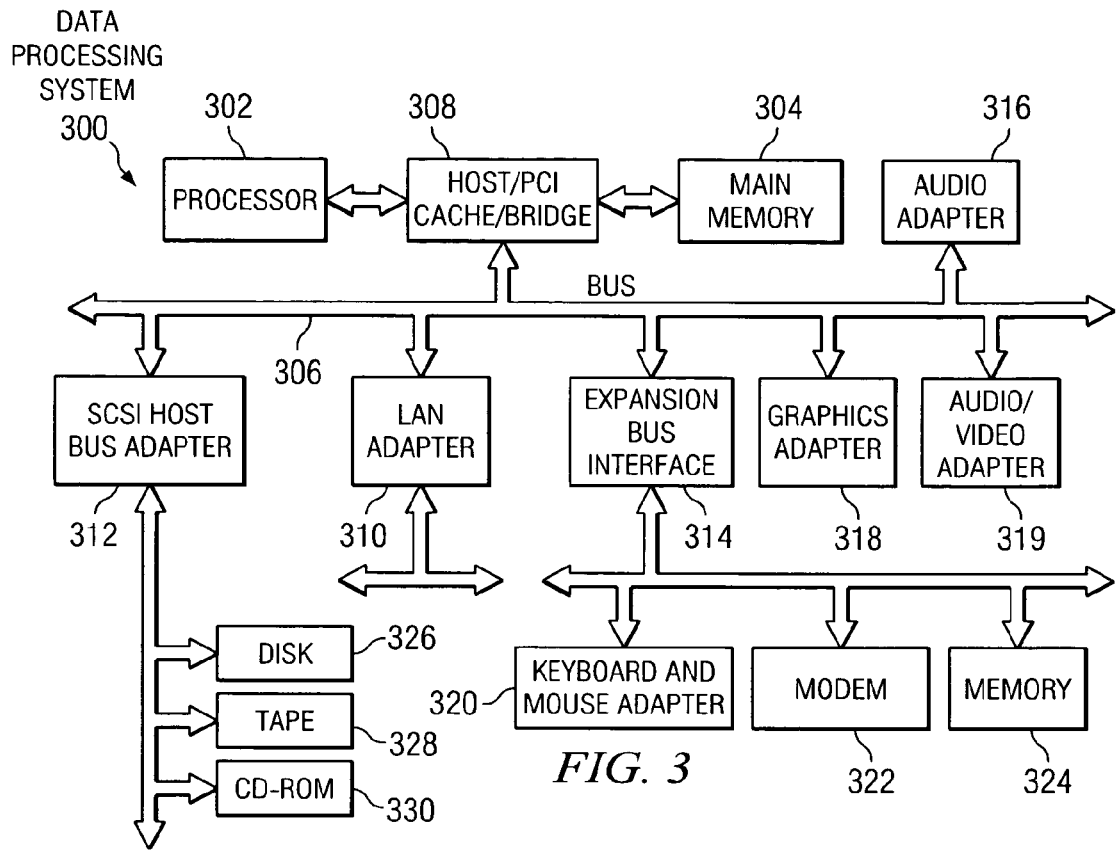
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client that is used to access email services.

As shown, data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302. In these illustrative examples, these applications include an email program or a browser for facilitating the exchange of email messages.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The particular illustration of data processing system 300 is meant to limit the implementation of the present invention in a client computer, such as a workstation or a personal computer. For example, data processing system 300 may be a personal digital assistant (PDA) device, which is configured with ROM and/or flash ROM in order to provide non-volatile memory for storing operating system files and/or user-generated data. For example, data processing system 300 also may be a notebook computer or hand held computer in addition to taking the form of a PDA. Data processing system 300 also may be a kiosk or a Web appliance.

The present invention provides an improved method, apparatus, and computer instructions for managing user actions taken on documents. The mechanism of the present invention assists a user in finding a most recent document within the same thread for propagation. In the illustrative examples, these documents are email messages.

The mechanism of the present invention is initiated at two different times in a workflow step in the illustrative examples. The mechanism is initiated when the workflow step begins. The workflow step begins when the user, for example, chooses to reply to an email message. Further, this mechanism also is initiated when the workflow step is completed. In these examples, the workflow step completes in these illustrative examples when a "send" key is selected. If, at either of these times, a more recent email message within the same thread is discovered, a prompt or warning is presented to the user. At that time, the user may reapply the workflow process to the more recent email message.

In this manner, the user may draft the appropriate response or make the appropriate changes to an email message. A later received email message may result in a change in the content composed by the user. For example, a reply received from another user may address the issue for which the workflow has been initiated. In this case, a reply to an email message may be cancelled. In other cases, a reply from another user may raise a new issue that the user wishes to address in the current reply.

If the user has chosen to reply to an email message that has a more recent reply than the one selected by the user, bringing the user's attention to the more recent reply may result in the user canceling the reply if the more recent email message addresses the issue for which the workflow has been initiated. In other cases, by identifying a more recent email message, the user may change the content of the reply.

Figure 4:
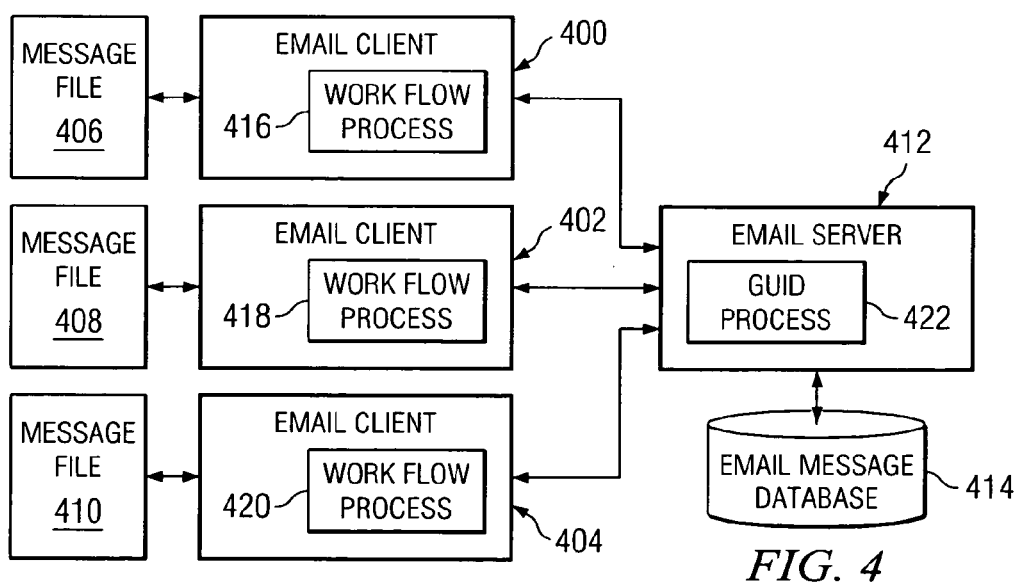
FIG. 4 is a diagram illustrating components used in ensuring that user actions are applied to a most recent email message in accordance with a preferred embodiment of the present invention.

With reference now to FIG. 4, a diagram illustrating components used in ensuring that user actions are applied to a most recent email message is depicted in accordance with a preferred embodiment of the present invention. In this illustrative example, email client 400, email client 402, and email client 404 are clients located in different data processing systems, such as client 108, client 110, and client 112 in FIG. 1. These email clients may be implemented using various programs, such as Microsoft Outlook, which is available from Microsoft Corporation, or Lotus Notes, which is available from International Business Machines Corporation. Message file 406, message file 408, and message file 410 are associated with these email clients. These message files serve to store email messages received by the clients. These message files may be organized into various mailboxes, such as an inbox, a sent items folder, a deleted folder, and an outbox.

These email programs may employ different protocols. For example, simple mail transfer protocol (SMTP) is a standard email protocol that is based on transmission control protocol (TCP)/Internet protocol (IP). This protocol defines a message format and the message transfer agent, which stores and forwards the mail. Other protocols, such as post office protocol 3 (POP3) also may be employed.

These email clients are employed by users to send email back and forth between different users through email server 412. Email messages sent to other email clients are stored in email message database 414 in this illustrative example. When an email client connects to email server 412, any messages for that particular email client are then sent to the client.

As illustrated, these email clients include an additional process, workflow process 416, workflow process 418, and workflow process 420. These processes are used to ensure that a user is initiating a workflow step with respect to the most recent copy or version of an email message or document. These workflow processes may be implemented as part of the email clients or as plug-ins to provide additional functionality for the email clients.

In these examples, a document, such as an email message, is propagated as replies are made to the document or as the document is forwarded to others. With each propagation of the document, additional information may be added to the document.

In the illustrative examples, the propagation of the document will be described with respect to replies. Of course, this mechanism may be applied to other types of document propagations, such as the forwarding of documents. For example, the mechanism of the present invention may be applied to short message service (SMS), multimedia message service (MMS), and forms management systems, such as those used for expense approvals or requests for information.

If a user at email client 400 selects a document for a workflow step, the workflow step is initiated when the document is selected. At this time, workflow process 416 determines whether the selected document is the most recent document in the thread. Workflow process 416 checks other documents within message file 406 to determine whether a more recent message in the thread is present in message file 406. If a more recent version is present, the user is notified that a more recent version is available. At this time, the user may choose to continue to generate a reply with the selected document or switch to the newer document.

When the user completes the workflow step by entering a user input to transmit the reply, workflow process 416 again checks message file 406 to see whether a more recent message in the thread is present in message file 406. This additional check is made to determine whether a more recent version of the document has been received since the user began drafting the reply.

In some cases, a reply may take hours or days to properly draft. In the intervening time when the user has begun the reply and decides to send the reply, one or more recent documents may be received. Again, if a more recent version of the document is present in message file 406, the user is prompted to determine whether to send the reply or cancel the reply. The user may cancel the reply to draft a reply to the more recent version of the document.

In the illustrative examples, workflow process 416, workflow process 418, and workflow process 420 include a function or process to allow identifying the origin or order of documents. In these examples, a document management system is employed to track the document flow history and ordering of that history. This process is implemented within workflow process 416, workflow process 418, and workflow process 420, and global unique ID (GUID) process 422. This mechanism adds information to the document header to track the origin and order of documents. GUID process 422 is employed to provide global unique identifiers for use in this tracking by workflow process 416, workflow process 418, and workflow process 420. A GUID is a value, number, or string, which is guaranteed to be unique within the system. For example, a GUID may be a combination of a value, such as a unique network address of a source or author document handling client, combined with a value, such as a timestamp, random number, or document serial number.

Figure 5:
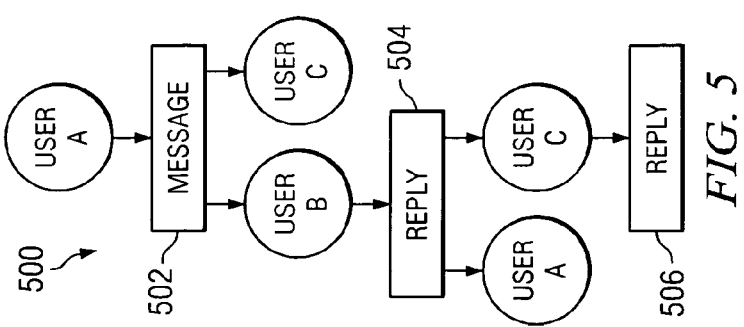
FIG. 5 is a diagram illustrating a message flow propagating a document in accordance with a preferred embodiment of the present invention.

With reference next to FIG. 5, a diagram illustrating a message flow propagating a document is depicted in accordance with a preferred embodiment of the present invention. Message flow 500 begins with User A generating message 502. This message is sent to User B and User C. User B generates reply 504, which is a more recent version of the document in message 502. In other words, reply 504 is a newer version of a document that is being edited and added to by User B. Reply 504 is sent to User A and User C. In these illustrative examples, a workflow step occurs each time a reply is initiated and sent.

At this time, if User C chooses to generate a reply selecting message 502, the workflow process in the email client for User C checks to see whether a more recent version of that document is present. In this case, a more recent version, reply 504, is present. In response to this identification, the workflow process generates a prompt to alert User C that a more recent version of message 502 is present. At that time, the user may cancel the reply to message 502 and begin a reply to reply 504 or continue with the reply to message 502. User C may wish to change the reply from message 502 to that for reply 504 to address issues or changes made to the document by User B.

In this illustrative example, User C drafts reply 506 to reply 504 in response to the prompt. When User C is ready to send reply 506, the workflow process in the email client makes another check to determine whether a more recent version of the document is present. A more recent version of the document would be an additional reply to message 502 in this illustrative example. For example, User A may have replied to reply 504 while User C is generating reply 506. If such a reply is found by the workflow process, then a prompt is generated for User C to indicate that a more recent version of the document is present. At that time, User C may decide to send reply 506 or may draft a reply to the new document.

An alternative mechanism for identifying related messages involves scanning document headers of messages in an inbox. For example, the subject, sender, timestamp, and recipients may be analyzed heuristically to determine whether messages are related and part of the same thread. Such a process may not always find all of the messages because in some cases, users may make changes to certain fields, such as the subject line. By using the GUID system in the illustrative embodiment, the use of the GUIDs in the header fields allows for the relationships between messages to be clearly defined.

Figure 6A:
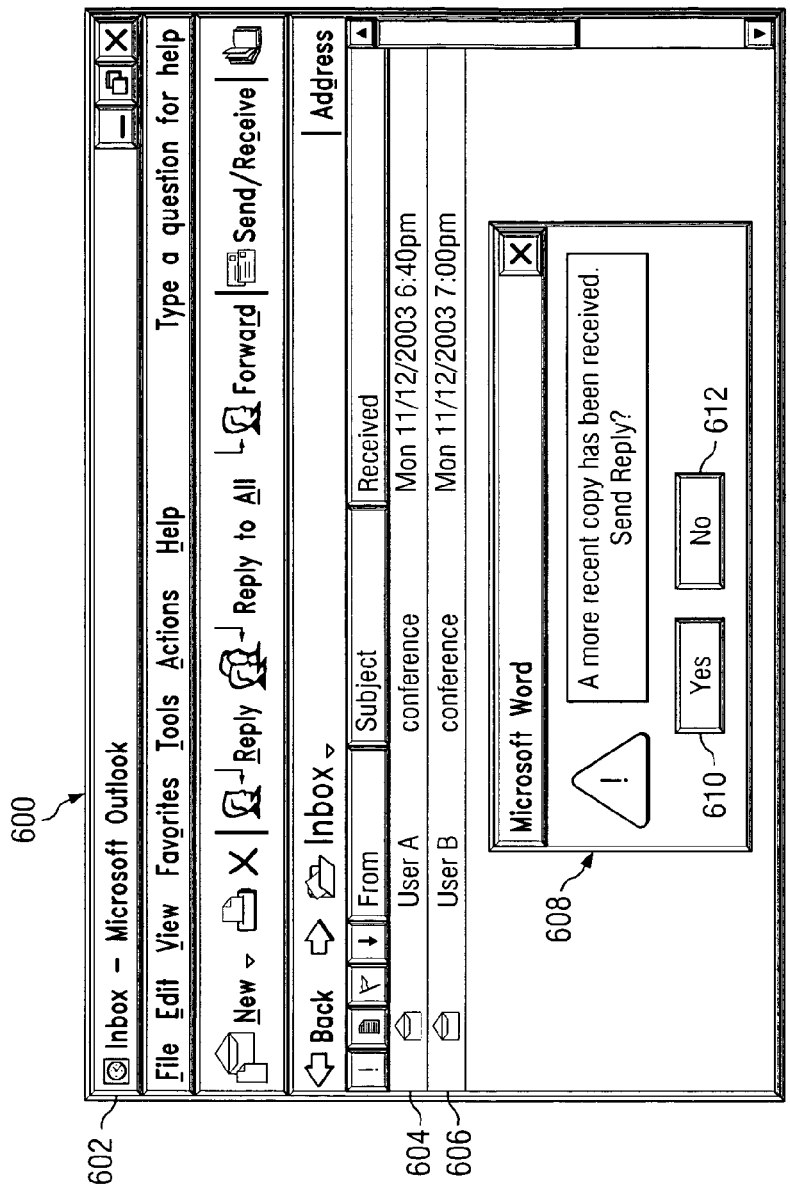
FIGS. 6A and 6B are diagrams illustrating indication of more recent copies of documents in accordance with a preferred embodiment of the present invention.
Figure 6B:
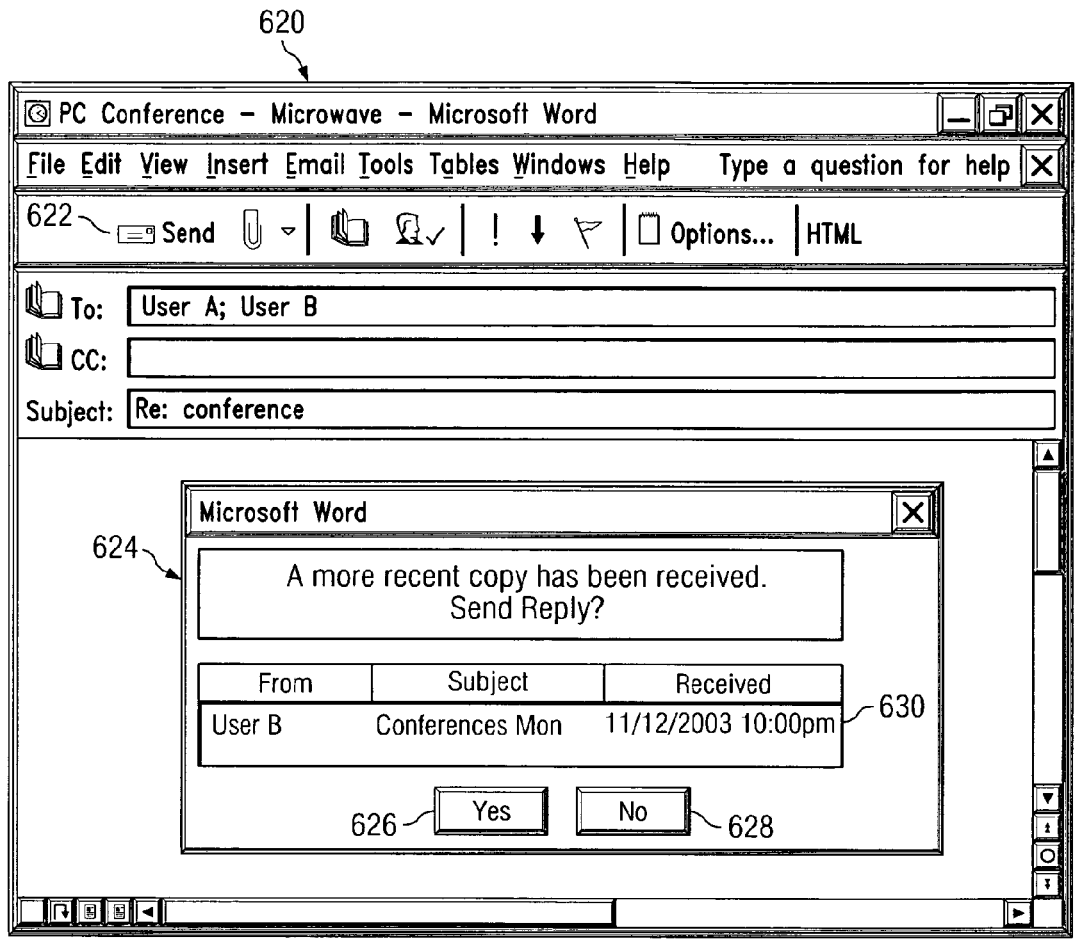

With reference now to FIGS. 6A and 6B, diagrams illustrating indication of more recent copies of documents are depicted in accordance with a preferred embodiment of the present invention. In these illustrative examples, the documents are email messages and replies being generated by a user, such as User C, as described with respect to FIG. 5.

In this example, window 600 is an example of a graphical user interface (GUI) for an email client, such as email client 400 in FIG. 4. As depicted, window 600 shows inbox 602 containing messages 604 and 606. Message 604 corresponds to message 502 in FIG. 5, while message 606 corresponds to reply 504 in FIG. 5. If the user selects message 604 to generate a reply, the workflow process for the email client displays window 608, which states that a more recent version of the document is available and prompts the user to indicate whether to use the more recent version for the reply. The user may choose to use the more recent version by selecting "yes" button 610. If the user wishes to continue to generate a reply to message 604, then the user selects "no" button 612.

In FIG. 6B, the user generates a reply in window 620. When the reply is complete, the user selects "send" button 622. The workflow process for the email client will then determine whether a more recent version of the document for which the reply is being generated has been received since the workflow step has begun. If a more recent version is present, then the workflow process presents window 624. This window states that a more recent version of the document has been received since the generation of the reply began. The window prompts the user as to whether the current reply should be sent. Additionally, an identification of the more recent version of the document is shown in line 630 of window 624. If the user chooses to send the current reply, the user selects "yes" button 626. The user may cancel the sending by selecting "no" button 628.

If the user selects "no" button 628, the user may then go back and look to see whether the user desires to alter the content of the reply in window 620 or whether to generate a new reply based on the more recent version of the document.

Figure 7:
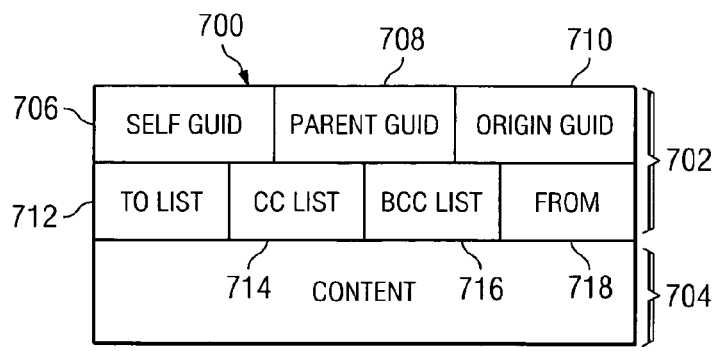
FIG. 7 is a diagram illustrating header information in a document, such as an email message, in accordance with a preferred embodiment of the present invention.

With reference now to FIG. 7, a diagram illustrating header information in a document, such as an email message, is depicted in accordance with a preferred embodiment of the present invention. Message 700 illustrates data items and descriptions for metadata information that may be located in a message, such as an email message. Message 700 includes header 702 and content 704. Content 704 contains the text for the message. Header 702 contains the information used to route and process message 700. In this example, header 702 contains seven entries: self GUID 706, parent GUID 708, origin GUID 710, To list 712, CC list 714, BCC list 716, and From field 718.

Self GUID 706, parent GUID 708, and origin GUID 710 are additional information added to a header for a document. Self GUID 706 is a GUID for the current document. The current document is the document that a user generates and sends. Parent GUID 708 is a GUID for the immediate predecessor document to the current document. For example, the parent GUID identifies the document to which a reply is being made. Origin GUID 710 is the GUID of the origin document for the current document. In these illustrative examples, the origin GUID document is the first document in the propagation of the different copies of the document.

To list 712 is a list of recipients or contributors to which the current document is directed. CC list 714 is a "carbon copy" of recipients, observers, or reviewers to which copies of the current document are directed. BCC list 716 is a "blind carbon copy" list of recipients, observers, or reviewers to which copies of the current document are directed, but whose identity is not shown to other recipients, observers, and reviewers. From field 718 is an indicator of the author or sender of the current document.

With this information, a workflow process, such as workflow process 416 in FIG. 4, may identify the order of email messages relative to other email messages within a conversation or thread. With this identification of ordering, a workflow process may determine whether a newer version of a document is present in a message file.

Figure 8:
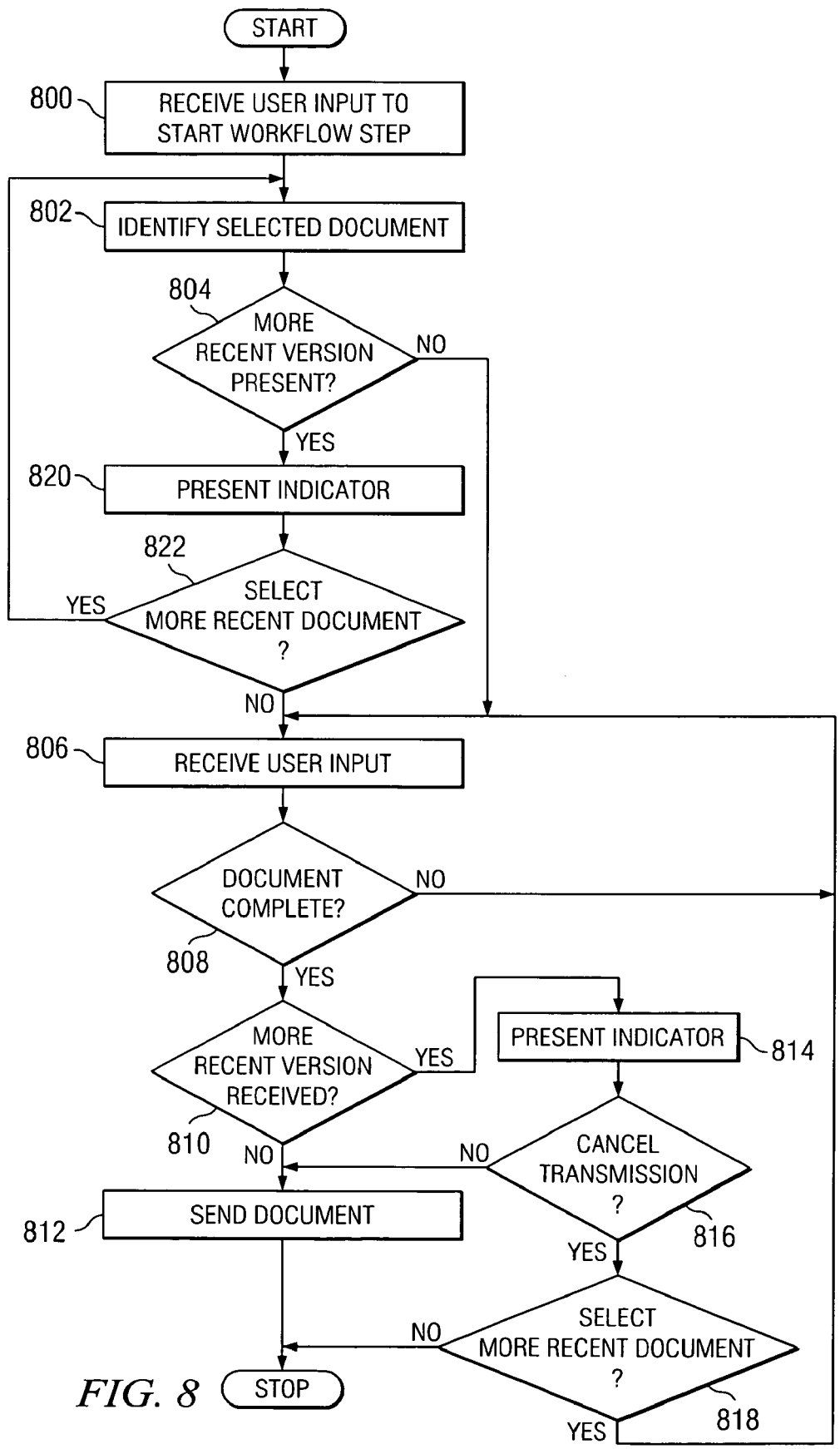
FIG. 8 is a flowchart of a process for ensuring user actions taken on a document are applied to the most recent version of a document in accordance with a preferred embodiment of the present invention.

With reference now to FIG. 8, a flowchart of a process for ensuring user actions taken on a document are applied to the most recent version of a document is depicted in accordance with a preferred embodiment of the present invention. The process illustrated in FIG. 8 may be implemented in an email client, such as email client 400 in FIG. 4. In particular, this process may be part of a workflow process added to the email client, such as workflow process 416 in FIG. 4.

The process begins by receiving a user input to start a workflow step (step 800). The user input, in these examples, is the user selecting a reply function to reply to an email message. Of course, other user inputs may be received to start the workflow step, such as the user may choose to forward a document. Next, the selected document is identified (step 802). This document is the document that has been selected for use in generating a reply in the illustrative examples. A determination is made as to whether a more recent version of the document is present (step 804).

If a more recent version is not present, then user input is received (step 806). This user input may include, for example, edits or additions to the content in the document as well as other functions that may be performed with the document. A determination is made as to whether the user input indicates that the document is complete (step 808). If the document is not complete, the process returns to step 806.

Otherwise, a determination is then made as to whether a more recent version of the document has been received since the workflow step began (step 810). If a more recent version has not been received, then the document is sent (step 812) with the process terminating thereafter.

With reference again to step 810, if a more recent version of the document has been received, then an indicator is presented (step 814). This indicator may take various forms. For example, the indicator may be a window, such as window 624 in FIG. 6B. A determination is made as to whether the user has decided to cancel the transmission of the document (step 816). If the user has decided to cancel the transmission, a determination is made as to whether the user has selected a more recent version of the document (step 818). If the user has selected a more recent version of the document, the process returns to step 806 as described above. Otherwise, the process terminates.

With reference again to step 816, if the user has decided to not cancel the transmission, the process proceeds to step 812 as described above. With reference again to step 804, if a more recent version of the document is present other than that selected by the user, an indicator is also presented (step 820). In this example, this indicator may take the form of a window, such as window 608 in FIG. 6A. A determination is then made as to whether the user has selected the more recent document for editing (step 822). If the user has selected the more recent document, the process returns to step 802 as described above. If the user has not selected the more recent version of the document, the process proceeds to step 806 as described previously.

Figure 9:
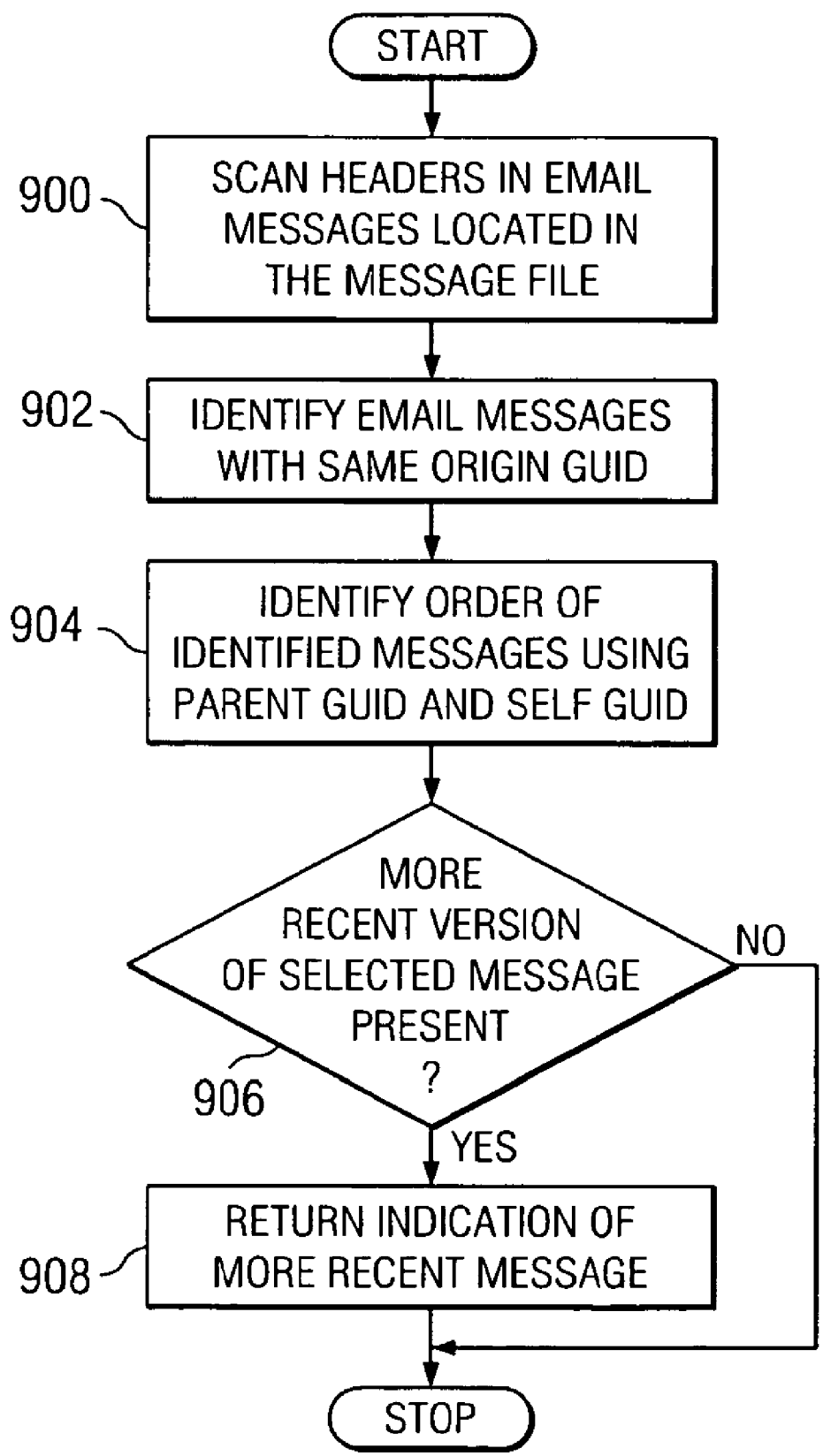
FIG. 9 is a flowchart of a process for identifying a most recent version of a document in accordance with a preferred embodiment of the present invention.

Turning now to FIG. 9, a flowchart of a process for identifying a most recent version of a document is depicted in accordance with a preferred embodiment of the present invention. The process illustrated in FIG. 9 may be implemented in a client process, such as workflow process 416 in FIG. 4.

The process begins by scanning headers in email messages located in the message file (step 900). The process in these illustrative examples looks for GUIDs. Email messages are identified with the same origin GUID as the message selected for the workflow step (step 902). Thereafter, the order of the messages in the identified messages are identified using the parent GUIDs found in these messages along with the self GUIDs (step 904).

Through the use of the parent GUID and the self GUID in each message, the relationship between different messages having the same original message may be identified. More information on the manner in which information may be identified through using GUIDs may be found in Colson et al., System and Method Enabling Future Messaging Directives Based on Past Participation Via a History Monitor, application Ser. No. 10/713,740, filed Nov. 13, 2003, assigned to the same assignee and incorporate herein by reference.

A determination is made as to whether a more recent version of the selected message is present (step 906). If a more recent version is present, an indication of the more recent message is returned (step 908) with the process terminating thereafter. This indication may be used to provide a warning or indication to the user through the GUI in the email client. This indication may be one, such as that provided through window 608 in FIG. 6A or window 624 in FIG. 6B. The process in FIG. 9 is initiated in these illustrative examples, at the beginning of the workflow step when a message is selected for processing, as well as, at the end of the workflow step when the message is ready to transmit.

With reference again to step 906, if a more recent version of the selected message is not present, the process terminates. In this instance, the message selected by the user for processing is the most recent version of the document.

Thus, the present invention provides an improved method, apparatus, and computer instructions for ensuring that user actions taken on a document are applied to the most recent version of that document. This mechanism is especially useful in workflow involving email messages. When a workflow step is initiated, such as replying or forwarding a message, the messages in a message file, such as in an inbox, are checked to see whether the message selected for processing is the most current version or recent copy available. If the most recent version has not been selected, then the user is provided an indication or warning that a more recent version is present.

At that time, the user may decide to reapply the workflow step to the more recent document. This check is made a second time when the workflow step is completing and a user input is received to send the message. This second step ensures that a more recent version of the document is not received while the user is editing or adding content to a selected message. If a more recent message is present on this second check, this message is presented to the user as a possible new base for the content that the user has edited or created with respect to the selected document. Thus, the user may be ensured that the user is always working with the most recent version of a document with respect to an original document.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the processes illustrated above may operate in the background when a user responds or forwards a note or email message. In this type of implementation, when a user input is received to generate a reply or forward a message, the mechanism of the present invention checks to see whether a more recent message is present. The mechanism of the present invention then continues to monitor the inbox until the message is actually sent. This type of implementation results in a real-time notification of the more recent message, as soon as the message arrives. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for indicating most recent messages in a related thread of messages in a message file, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to determine whether a more recent message in the thread of related messages is present in a message file in response to a first user input selecting the message for processing; and present a first indication of the more recent message if the more recent message in the thread of related messages is present in the message file.

2. The data processing system of claim 1, wherein the processing unit further executes the set of instructions to determine whether the more recent message in the thread of related messages has been received in the message file in response to a second user input to send the message; and present a second indication of the more recent message if the more recent message in the thread of related messages has been received in the message file.

3. A data processing system for indicating most recent messages in a related thread of messages in a message file, the data processing system comprising:
    determining means, responsive to a first user input selecting a message for processing by a processor, for determining whether a more recent message in the thread of related messages is present in the message file; and
    presenting means for presenting a first indication of the more recent version if the more recent version of the document is present in the message file.

4. The data processing system of claim 3, wherein the determining means is a first determining means and the presenting means is a first presenting means and further comprising:
    second determining means, responsive to a second user input to send the message, for determining whether the more recent message in the thread of related messages has been received in the message file; and
    second presenting means for presenting a second indication of the more recent message if the more recent message in the thread of related messages has been received in the message file.

5. The data processing system of claim 4, wherein each message in the message file includes a set of globally unique identifiers and wherein the first determining means includes using means for using globally unique identifiers to determine whether the more recent message in the thread of related messages is present in the message file.

6. The data processing system of claim 4, wherein the first user input begins a workflow step and the second user input ends the workflow step.

7. The data processing system of claim 3, wherein the first determining means includes analyzing means for heuristically analyzing header information in each message present in the message file to determine whether the more recent message in the thread of related messages is present in the message file.

8. The data processing system of claim 3, further comprising:
    providing means, responsive to presenting the first indication, for providing a user an ability to select the more recent message in the thread of related messages for processing.

9. The data processing system of claim 3, wherein the message is an email message.

10. The data processing system of claim 9, wherein the first user input is a selection of the email message for a reply.

11. The data processing system of claim 9, wherein the first user input is a selection of the email message to be forwarded.

12. The data processing system of claim 3, wherein the first determining means, the first presenting means, the second determining means, and the second presenting means are implemented in a client email application executing on the data processing system.

13. A computer program product in a computer readable storage medium for indicating most recent messages in a related thread of messages in a message file, the computer program product comprising:

first instructions, responsive to a first user input selecting a message for processing by a processor, for determining whether a more recent message in the thread of related messages is present in the message file; and second instructions for presenting a first indication of the more recent message if the more recent message in the thread of related messages is present in the message file.

14. The computer program product of claim 13, further comprising:

third instructions, responsive to a second user input to send the message, for determining whether the more recent message in the thread of related messages has been received in the message file; and fourth instructions for presenting a second indication of the more recent message if the more recent message in the thread of related messages has been received in the message file.

15. The computer program product of claim 14, wherein each message in the message file includes a set of globally unique identifiers and wherein the first instructions includes sub-instructions for using globally unique identifiers to determine whether the more recent message in the thread of related messages is present in the message file.

16. The computer program product of claim 14, wherein the first instructions includes sub-instructions for heuristically analyzing header information in each message present in the message file to determine whether the more recent version is present in the message file.

17. The computer program product of claim 14, wherein the first user input begins a workflow step and the second user input ends the workflow step.

18. The computer program product of claim 13, further comprising:

third instructions, responsive to presenting the first indication, for providing a user an message in the thread of related messages version of the document for processing.

19. The computer program product of claim 13, wherein the message is an email message.

20. The computer program product of claim 19, wherein the first user input is a selection of the email message for a reply.

21. The computer program product of claim 19, wherein the first user input is a selection of the email message to be forwarded.

22. The computer program product of claim 13, wherein the computer program product is implemented in a client email application executing on the data processing system.

* * * * *